US008569995B2

(12) United States Patent  
Eberhard et al.

(10) Patent No.: US 8,569,995 B2  
(45) Date of Patent: Oct. 29, 2013

(54) CONTROL CIRCUIT AND METHOD FOR CONTROLLING A PLURALITY OF BATTERY CELLS BASED ON A DETERMINED NUMBER OF COUPLED BATTERY CELLS

(75) Inventors: Martin Eberhard, Woodside, CA (US); Marc Tarpenning, Woodside, CA (US); Jessica Riley, Mountain View, CA (US); Steven Diamond, San Matteo, CA (US); Jaime Camhi, Sunnyvale, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 375 days.

(21) Appl. No.: 13/009,486

(22) Filed: Jan. 19, 2011

(65) Prior Publication Data

US 2012/0119705 A1    May 17, 2012

Related U.S. Application Data

(60) Provisional application No. 61/413,723, filed on Nov. 15, 2010.

(51) Int. Cl.  
*H02J 7/00* (2006.01)

(52) U.S. Cl.  
USPC .......................................... 320/118; 320/106

(58) Field of Classification Search  
USPC ....................................................... 320/118  
See application file for complete search history.

(56) References Cited

U.S. PATENT DOCUMENTS

| | | | |
|---|---|---|---|
| 5,504,415 A * | 4/1996 | Podrazhansky et al. ...... | 320/118 |
| 5,825,155 A * | 10/1998 | Ito et al. ........................ | 320/118 |
| 2005/0066208 A1* | 3/2005 | Koie et al. ..................... | 713/320 |
| 2009/0066273 A1* | 3/2009 | Dunn ............................. | 318/376 |

* cited by examiner

*Primary Examiner* — Arun Williams  
(74) *Attorney, Agent, or Firm* — Kenyon & Kenyon LLP

(57) ABSTRACT

A method for controlling a plurality of battery cells with a control circuit coupled to the plurality of battery cells, includes: supplying the control circuit with electrical energy from the coupled battery cells; determining a number of battery cells coupled to the control circuit; and automatically adapting a power consumption drawn from the battery cells in response to the number of coupled battery cells.

16 Claims, 3 Drawing Sheets

CONTROL CIRCUIT AND METHOD FOR CONTROLLING A PLURALITY OF BATTERY CELLS BASED ON A DETERMINED NUMBER OF COUPLED BATTERY CELLS

CROSS-REFERENCE TO RELATED APPLICATIONS

The present application claims the benefit of U.S. Provisional Patent Application Ser. No. 61/413,723, filed on Nov. 15, 2010, which is expressly incorporated herein in its entirety by reference thereto.

FIELD OF THE INVENTION

The present invention relates to a method for controlling a plurality of battery cells, a control circuit configured to control a plurality of battery cells, a battery module including a plurality of battery groups, and a vehicle with an electrical engine and a battery module for powering the electrical engine.

SUMMARY

According to example embodiments of the present invention, a method for controlling a plurality of battery cells is provided. The battery cells are controlled with a control circuit coupled to the battery cells. According to the method, the control circuit is supplied with electrical energy from the coupled battery cells. Furthermore, a number of battery cells coupled to the control circuit is determined. Based on the number of battery cells coupled to the control circuit a power consumption drawn from the battery cells is automatically adapted.

According to example embodiments of the present invention, a control circuit configured to control a plurality of battery cells is provided. The control circuit includes a plurality of terminals, a power supply unit, a battery cell control unit, and an energy control unit. The plurality of terminals are configured to be coupled to the plurality of battery cells. The power supply unit is configured to generate electrical energy for the control circuit. The electrical energy for the control circuit is derived from or drawn from electrical energy of the battery cells. The battery cell control unit is configured to determine the number of battery cells which are coupled to the control circuit. The energy control unit is configured to adapt a power consumption drawn from the battery cells based on the number of battery cells coupled to the control circuit.

According to example embodiments of the present invention, a battery module is provided. The battery module includes a plurality of battery groups. Each battery group includes a plurality of battery cells and a control circuit configured to control the plurality battery cells of the battery group. The control circuit includes a plurality of terminals coupled to the plurality of battery cells, a power supply unit, a battery cell control unit, and an energy control unit. The power supply unit is configured to generate electrical energy for the control circuit from the energy of the battery cells. The battery cell control unit is configured to determine a number of battery cells which is couple to the control circuit. The energy control unit is configured to adapt a power consumption drawn from the battery cells in response to the number of coupled battery cells.

According to example embodiments of the present invention, a vehicle is provided. The vehicle includes an electrical engine for providing a driving force for driving the vehicle and a battery module for powering the electrical engine. The battery module includes a plurality of battery groups, and each battery group includes a plurality of battery cells. Furthermore, each battery group includes a control circuit configured to control the plurality of battery cells of the battery group. The control circuit includes a plurality of terminals coupled to the plurality of battery cells, a power supply unit, a battery cell control unit, and an energy control unit. The power supply unit is configured to generate electrical energy for the control circuit from electrical energy of the battery cells. The battery cell control unit is configured to determine a number of battery cells coupled to the control circuit. The energy control unit is configured to adapt a power consumption drawn from the battery cells in response to the number of coupled battery cells.

Although specific features described in the above summary and the following detailed description are described in connection with particular example embodiments, it is to be understood that the features described herein can be combined with each other unless it is noted otherwise.

Hereinafter, exemplary embodiments of the invention will be described with reference to the drawings.

DETAILED DESCRIPTION

Figure 1:
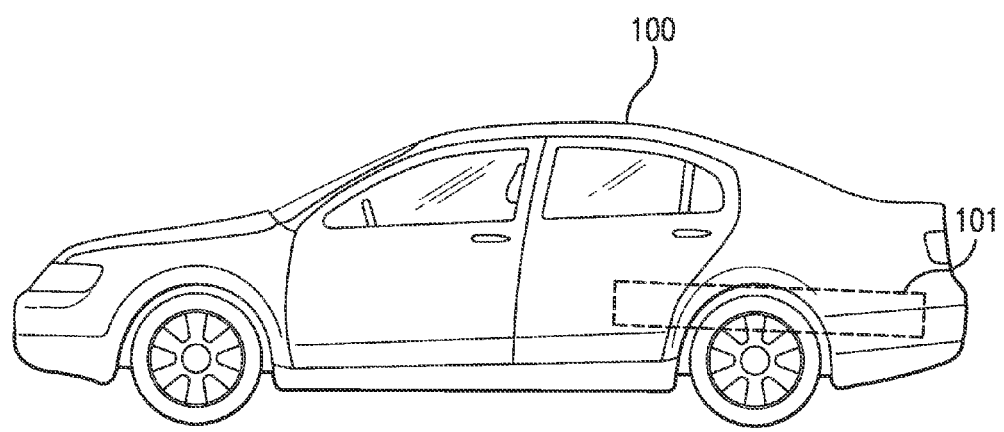
FIG. 1 schematically illustrates a vehicle with a battery module according to an example embodiment of the present invention.

In the following, exemplary embodiments of the present invention will be described in more detail. It is to be understood that the following description is given only for the purpose of illustrating the principles hereof and is not to be taken in a limiting sense.

It is to be understood that the features of the various exemplary embodiments described herein may be combined with each other unless specifically noted otherwise.

It is further to be understood that in the following detailed description any direct connection or coupling between functional blocks, devices, components or other physical or functional units shown in the drawings or described herein may also be implemented in an indirect connection or coupling. The same reference signs in the various instances of the drawings refer to similar or identical components.

According to example embodiments, a method for controlling a plurality of battery cells is provided. The battery cells are controlled with a control circuit coupled to the battery cells. According to the method, the control circuit is supplied with electrical energy from the coupled battery cells. Furthermore, a number of battery cells coupled to the control circuit is determined. Based on the number of battery cells coupled to the control circuit a power consumption drawn from the battery cells is automatically adapted.

The power consumption or energy drawn from the battery cells in response to the number of coupled battery cells may be drawn to the control circuit and consumed inside of the control circuit or guided to an appropriate load, or may be drawn or bled at an appropriate load under the control of the control circuit.

According to example embodiments, the power consumption is automatically adapted by automatically directing at least a portion of the electrical energy from the battery cells to a balancing circuit in response to the number of coupled battery cells. The balancing circuit may be provided in the control circuit or may be coupled to the control circuit and may be adapted to consume or bleed the electrical energy directed to the balancing circuit. The balancing circuit may include, for example, a transistor and a resistor coupled in parallel to each battery cell of the plurality of battery cells and the transistor may be controlled by the control circuit.

According to example embodiments, the step of automatically adapting the power consumption includes an automatic adjustment of a period of time in which a component connected to the control circuit is powered with electrical energy from the battery cells via the control circuit. The electrical component may include, for example, a light emitting diode, a voltage reference or a temperature sensor coupled to the control circuit. The light emitting diode may be part of an operation display of a battery module including the battery cells and the control circuit. The voltage reference may be a common external voltage reference of the battery module providing several control circuits with a reference voltage. The temperature sensor may be a sensor for monitoring a temperature of the battery module.

Furthermore, the step of automatically adapting the power consumption includes an automatic adjustment of a period of low power time of the control circuit. The control circuit may have different operating modes, for example, an active mode and a standby mode. In the standby mode, the power consumption of the control circuit may be lower than in the active mode. By adjusting a relation between the high power active time and the low power standby time of the control circuit, the average power consumption of the control circuit can be adapted.

According to example embodiments, the battery cells are coupled in a series connection and the control circuit is connected to each terminal of each cell of the plurality of battery cells. As in a series connection for example a plus terminal of a first battery cell is connected to a minus terminal of a second battery cell, and the plus terminal of the second battery cell is connected to a minus terminal of a third battery cell, and so on, each terminal of each cell can be connected to the control circuit by connecting the control circuit to the end terminals of the series connection and to each intermediate connection between connected terminals of two neighboring battery cells.

In the series connection the control circuit can be supplied with electrical energy provided at the end terminals of the series connection.

According to example embodiments, a control circuit configured to control a plurality of battery cells is provided. The control circuit includes a plurality of terminals, a power supply unit, a battery cell control unit, and an energy control unit. The plurality of terminals are configured to be coupled to the plurality of battery cells. The power supply unit is configured to generate electrical energy for the control circuit. The electrical energy for the control circuit is derived from or drawn from electrical energy of the battery cells. The battery cell control unit is configured to determine the number of battery cells which are coupled to the control circuit. The energy control unit is configured to adapt a power consumption drawn from the battery cells based on the number of battery cells coupled to the control circuit.

According to example embodiments, the energy control unit is coupled to a balancing circuit and configured to adapt the power consumption by directing electrical energy from the battery cells to the balancing circuit in response to the number of coupled battery cells.

The control circuit may further include a terminal to couple the control circuit to an external electrical component. The electrical component may include for example a light emitting diode, a voltage reference, or a temperature sensor. The energy control unit may be configured to adapt the power consumption drawn from the battery cells by adjusting a period of time in which the external component is powered with electrical energy. By varying a duty cycle of a period of time in which the external component is powered with electrical energy and a period of time in which the external component is not powered with electrical energy, an average power consumption can be adjusted. The electrical energy directed to the external component may be directed via the power supply unit of the control circuit to the external component.

According to example embodiments, the energy control unit is configured to adapt the power consumption drawn from the battery cells by adjusting an amount of low power time of the control circuit. The control circuit may provide at least two operating modes, an active mode and a low power standby mode. By adjusting a duty cycle of a period of time in which the control circuit is in the active mode and a period of time in which the control circuit is in the low power standby mode, an average power consumption of the control circuit can be adjusted.

According to example embodiments, the battery cells are connected in a series connection and the power supply unit is coupled to end terminals of the series connection of the battery cells. Furthermore, the control circuit may be connected to each terminal of each of the plurality of battery cells for monitoring each of the battery cells separately.

According to example embodiments, a battery module is provided. The battery module includes a plurality of battery groups. Each battery group includes a plurality of battery cells and a control circuit configured to control the plurality battery cells of the battery group. The control circuit includes a plurality of terminals coupled to the plurality of battery cells, a power supply unit, a battery cell control unit, and an energy control unit. The power supply unit is configured to generate electrical energy for the control circuit from the energy of the battery cells. The battery cell control unit is configured to determine a number of battery cells which is couple to the control circuit. The energy control unit is configured to adapt a power consumption drawn from the battery cells in response to the number of coupled battery cells.

According to example embodiments, the battery cells are connected in a series connection. Each terminal of each of the plurality of battery cells is connected to the control circuit via the plurality of terminals.

According to example embodiments, a vehicle is provided. The vehicle includes an electrical engine for providing a driving force for driving the vehicle and a battery module for powering the electrical engine. The battery module comprises a plurality of battery groups, and each battery group includes a plurality of battery cells. Furthermore, each battery group includes a control circuit configured to control the plurality of battery cells of the battery group. The control circuit includes a plurality of terminals coupled to the plurality of battery cells, a power supply unit, a battery cell control unit, and an energy control unit. The power supply unit is configured to generate electrical energy for the control circuit from electrical energy of the battery cells. The battery cell control unit is configured to determine a number of battery cells coupled to the control circuit. The energy control unit is configured to adapt a power consumption drawn from the battery cells in response to the number of coupled battery cells.

The above described exemplary embodiments will now be described in more details with reference to the accompanying drawings.

FIG. 1 shows a vehicle 100 including a battery module 101. The vehicle 100 may include an electrical engine providing a driving force for driving the vehicle 100. The electrical engine is powered with electrical energy of the battery module 101. The vehicle 100 may be an electric vehicle including only an electrical drive for driving the vehicle, or may be a so-called hybrid vehicle including an electrical drive and a further drive, for example a combustion engine, for driving the vehicle or for generating electrical energy for powering the electrical engine or for charging the battery module 101. The vehicle may additionally include a connector for connecting a charging unit of the vehicle to an electrical power system for charging the battery module 101.

The battery module 101 includes a large number of battery cells. Typically, the battery module 101 of the electric vehicle 100 may include several hundred up to several thousands of battery cells. In the present context, a single cell and a group of cells in parallel are not distinguished and therefore the term battery cell is used likewise for a single battery cell and a group of battery cells in parallel. Furthermore, in the present context, the terms battery module and battery pack are used synonymously. Monitoring the voltage levels of these cells and correcting for any imbalances is an important issue for the battery module, for example, for accomplishing a long lifetime of the battery module, a high capacity of the battery module, and a safe operation of the battery module. However, as larger battery modules are developed, where a number of cells, or groups of cells in parallel, are placed in series, it becomes more complex to monitor and manage the individual cells or parallel groups of cells.

A number of integrated circuits have been developed that assist in the management of battery cells connected in a series connection, so-called series stacks of battery cells, including for example Linear Technology's LTC6802, Analog Device's AD8280, and Maxim's MAX11080.

In some battery modules it may be the case that battery groups including a serial connection of battery cells are physically separated from one another. In this case, it may be desirable to have one battery management circuit with each of the physical battery groups. The number of battery cells in the series connection in each battery group may be different. Due to the different number of battery cells in the series connection a different board or integrated circuit may be provided for each group requiring its own hardware and its own software. When monitoring different numbers of battery cells in a series connection and imbalance in the power drawn from the battery cells to power the battery management circuit may occur. For example, supposing a battery management circuit requires 1 W to operate, the power drawn from each cell will be 0.2 W, if the battery management circuit is connected to five battery cells in a series connection. If the same battery management circuit is connected to for example ten battery cells in a series connection, the power drawn from each battery cell will be 0.1 W. The overall performance of the battery module will improve the closer the battery cells are kept in balance to each other. Therefore, according to example embodiments of the present invention, the power drawn from each cell to power the battery management circuits is automatically equalized as will be shown in the following in connection with FIGS. 2 and 3.

Figure 2:
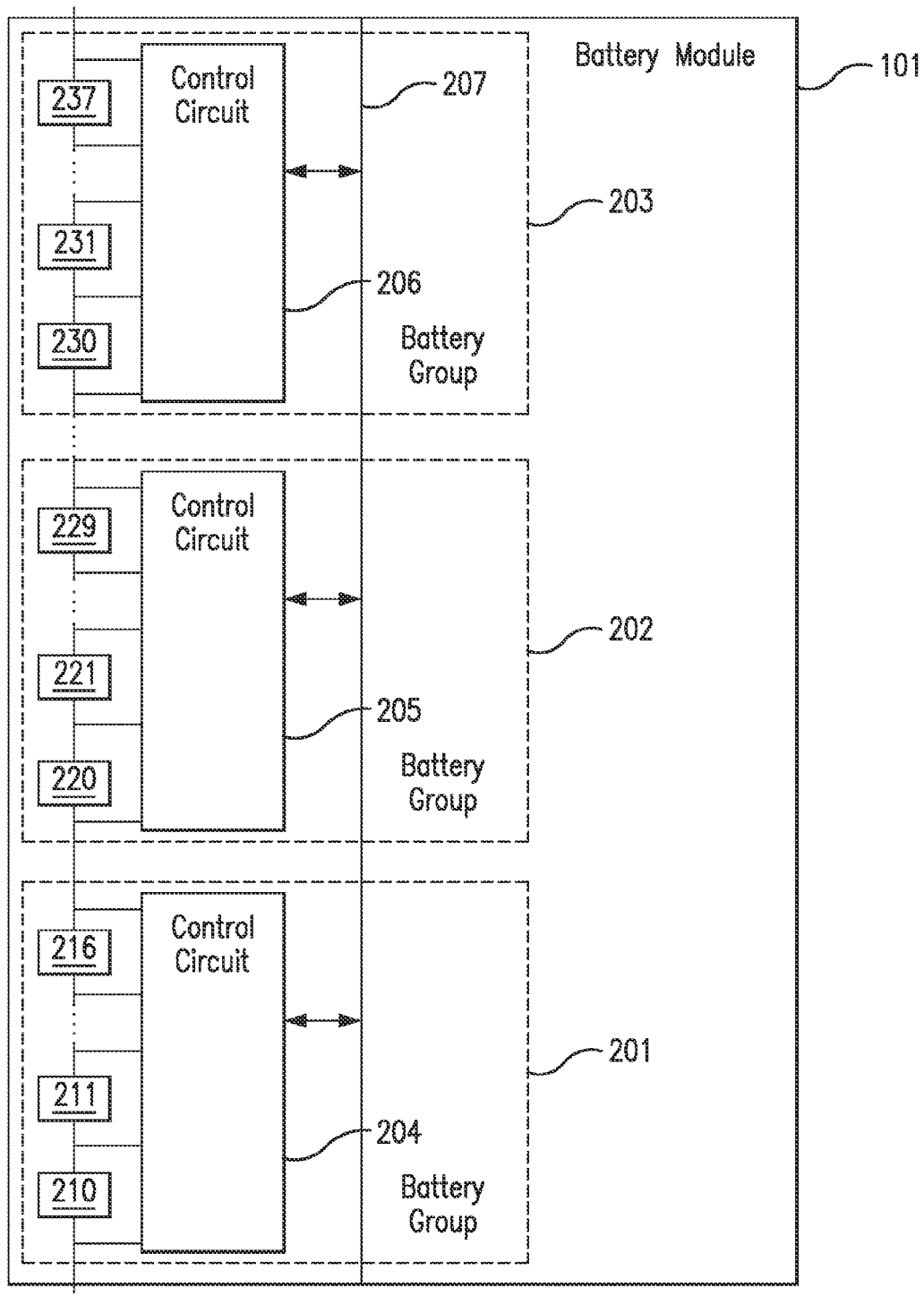
FIG. 2 schematically illustrates a battery module according to an example embodiment of the present invention including a plurality of battery groups.

FIG. 2 shows a battery module 101 including a plurality of battery groups 201 to 203. In FIG. 2, three battery groups 201 to 203 are shown, but any other number of battery groups may be implemented. Each battery group 201 to 203 includes a control circuit 204 to 206 for managing battery cells provided in each battery group 201 to 203. Therefore, battery group 201 includes control circuit 204 for controlling battery cells 210 to 216, battery group 202 includes control circuit 205 for controlling battery cells 220 to 229, and battery group 203 includes control circuit 206 for controlling battery cells 230 to 237. The control circuits 204 to 206 are arranged identically and are adapted to manage different numbers of battery cells in series. In the example shown in FIG. 2, control circuit 204 manages seven battery cells, control circuit 205 manages ten battery cells, and control circuit 206 manages eight battery cells. Managing the battery cells 210 to 237 may include, for example, monitoring a voltage and a status of each of the battery cells. Monitoring results may be communicated via a common data bus 207 connecting the control circuits 204 to 206 to a battery module control unit of the battery module 101. Operation power for each of the control circuits 204 to 206 may be drawn from the corresponding plurality of battery cells the respective control circuit is connected to. In exemplary embodiments, the operation power of the control circuits 204 to 206 is drawn only from the corresponding plurality of battery cells.

Figure 3:
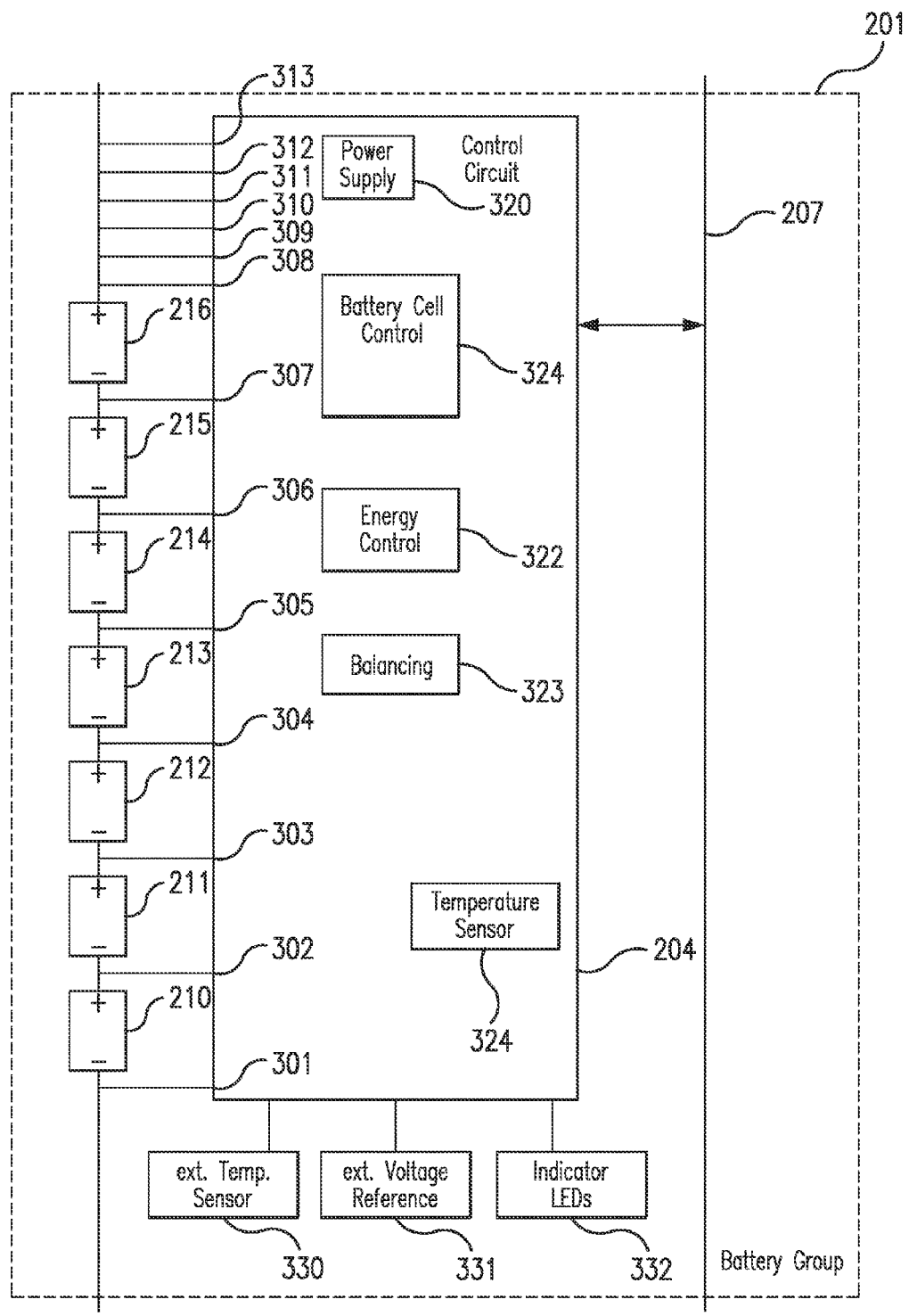
FIG. 3 schematically illustrates a battery group according to an example embodiment of the present invention including a control circuit, a plurality of battery cells, and external components.

FIG. 3 shows the battery group 201 and the control circuit 204 of FIG. 2 in more detail. As described above, control circuit 204 is connected to a series connection of seven battery cells 210 to 216. For individually controlling each of the battery cells 210 to 216, the control circuit 204 includes a plurality of terminals 301 to 313. The battery cells 210 to 216 are connected in a series connection such that the plus terminal of battery 210 is connected to the minus terminal of battery cell 211, the plus terminal of battery cell 211 is connected to the minus terminal of battery cell 212 and so on. For individually monitoring each of the battery cells 210 to 216, the minus terminal of battery cell 210 is connected with terminal 301 of the control circuit 204, the connection between battery cells 210 and 211 is connected to terminal 302, the connection between battery cell 211 and 212 is connected to terminal 303 and so on. Finally, the plus terminal of battery cell 216 is connected to terminal 308 of the control circuit 204.

The control circuit 204 shown in FIG. 3 is configured to monitor up to twelve battery cells and provides therefore further terminals 309 to 313 for connecting five more battery cells. However, in the example shown in FIG. 3, the battery group 201 includes only seven battery cells 210 to 216 and therefore the terminals 309 to 313 are connected commonly to the plus terminal of battery cell 216. In other example embodiments, the unused terminals 209 to 213 may be left open.

As shown in FIG. 3, the control circuit 204 may include furthermore a power supply unit 320, a battery cell control unit 321, an energy control unit 322, a balancing unit 323, and a temperature sensor 324. Furthermore, as shown in FIG. 3, the battery group 201 may include an external temperature sensor 330, an external voltage reference 331, and indicator LEDs 332 which are connected to the control circuit 204.

As described above, the control circuit 204 is configured to monitor a different number of battery cells depending on the application in which the control circuit 204 is used. In the example shown in FIG. 3, the control circuit 204 is used for monitoring seven battery cells. However, the control circuit 204 is adapted to monitor for example up to twelve battery cells and provides therefore the further terminals 309 to 313.

Therefore, the battery cell control unit 321 is adapted to determine the number of battery cells connected to the control circuit 204. For example, the battery cell control unit may include a jumper field in which the number of connected battery cells can be configured when the battery group 201 is assembled. Furthermore, the battery cell control unit 221 may automatically determine the number of connected battery cells, for example, by monitoring each of the voltages between neighboring pairs of the terminals 301 to 313. If a voltage above a predetermined threshold is monitored between a pair of neighboring terminals of the terminals 301 to 313, the battery cell control unit 321 may determine that between this pair of terminals a battery cell is present. If the determined voltage is below the threshold, the battery cell control unit 321 may determine that no battery cell is connected between the corresponding pair of terminals. In the example shown in FIG. 3, the battery cell control unit 321 may determine that seven battery cells are present.

The energy for operating the control circuit 204 may be provided by the power supply unit 320. The power supply unit 320 may derive the energy for powering the control circuit 204 from the connected battery cells 210 to 216. As the number of battery cells may vary also a voltage between end terminals of the series connection of the battery cells 210 to 216 may vary. Therefore, the power supply unit 320 may be adapted to provide a constant supply voltage to the control circuit 204 independently from the number of connected battery cells. This may be accomplished for example by a voltage controller or a DC/DC converter as is conventional. As the control circuit 204 consumes in general a specific amount of electrical power which may vary with an operational state or operation mode of the control circuit 204 but which is in general independent of the number of connected battery cells, the power drawn from each individual battery cell for powering the control circuit 204 depends on the number of battery cells connected to the control circuit 204. In exemplary embodiments, the control circuit 204 may need 1 W in an active operation mode. Thus, when the control circuit is connected to seven battery cells as shown in FIG. 3, 1/7 W is drawn from each of the battery cells 210 to 216. However, if the control circuit is connected to a different number of battery cells, for example, like control circuit 205 of FIG. 2 which is connected to ten battery cells, a different power is drawn from those battery cells. In the example in FIG. 2 from each battery cell 220 to 229 only 0.1 W is drawn for powering the control circuit 205. Thus, there may be an imbalance between loads on the battery cells of each of the battery groups 201 to 203.

For avoiding this imbalance, the control circuit 204 includes the energy control unit 322 which is configured to adapt a power consumption drawn from the battery cells connected to the control circuit 204 in response to the number of coupled battery cells. The information about the number of coupled battery cells is provided to the energy control unit 322 by the battery cell control unit 321 as described above. Based on this information the energy control unit 322 automatically increases or decreases the power consumption drawn from the battery cells 210 to 216 as will be described below.

For example, the energy control unit 322 may vary the periods of time in which the control circuit 204 is in an active mode and the periods of time in which the control circuit 204 is in an inactive mode. As the control circuit 204 consumes less energy in an inactive mode, an average power consumption of the control circuit 204 can be varied by changing the duty cycle of the control circuit 204. Furthermore, power consuming measurements, for example a temperature measurement of the control circuit 204 with an internal temperature sensor 324 of the control circuit 204 may be performed more frequently to increase the power consumption of the control circuit 204 or may be performed less frequently to reduce an average power consumption of the control circuit 204.

Furthermore, the control circuit 204 may include the balancing unit 323 which may be adapted to draw electrical energy selectively from each of the battery cells 210 to 216 individually and consume the drawn energy in for example resistors. Such balancing units 323 are commonly used in a control circuit for balancing the individual battery cells 210 to 216 connected to the control circuit 204 for example during a charging of the battery cells. The balancing unit 323 may include, for example, for each of the battery cells 210 to 216 a resistor which can be controlled selectively via a transistor to shortcut the respective battery cell providing thus a controlled bleeding of energy of the respective battery cell.

Furthermore, the energy control unit 322 may vary a duty cycle of components 330 to 332 of the battery group 201. For example, indicator LEDs 332 indicating a status of the battery group 201 may be activated more frequently or for longer periods to increase the power drawn from the battery cells 210 to 216. Furthermore, the external temperature sensor 330 which may be used for monitoring a temperature of the battery group 201 may be activated and read out more frequently to increase the power drawn from the battery cells 210 to 216. Finally, the amount of time the external voltage reference 331 is activated may be varied to adjust the amount of power drawn from the battery cells 210 to 216.

The control circuit 204 shown in FIG. 3 may be implemented as a circuit board including a plurality of discrete components, for example as shown in FIG. 3. However, these components may be combined with each other, for example, the battery cell control unit 321 and the energy control unit 322 may be combined in a single component. Furthermore, all or a part of the components of the control circuit 204 may be integrated in an integrated semiconductor circuit. Furthermore, the components of the control circuit 204 may be arranged as discrete logic components or may be arranged at least in part in a processor or a controller executing a corresponding software program.

The control circuit described above allows a single configuration to work with different numbers of battery cells in a series connection in a battery module. The control circuit may work with for example three to twelve cells. Therefore, a single configuration for the control circuit can be used in a wide range of applications thus lowering the cost of the control circuit. Furthermore, development of new battery modules may be easier and faster by eliminating the need to redesign the control circuit.

While exemplary embodiments have been described above, various modifications may be implemented in other example embodiments. For example, additional assembly loads may be provided on the control circuit or may be connected to the control circuit, and may be powered depending on the number of connected battery cells. These additional assembly loads may be powered for example by the power supply unit for increasing the power drawn from the battery cells.

What is claimed is:
1. A method for controlling a plurality of battery cells with a control circuit coupled to the plurality of battery cells, comprising:
  supplying the control circuit with electrical energy from the coupled battery cells;
  determining a number of battery cells coupled to the control circuit; and automatically adapting a power consumption drawn from the battery cells in response to the number of coupled battery cells.

2. The method according to claim 1, wherein the automatically adapting the power consumption includes automatically directing at least a portion of the electrical energy to a balancing circuit in response to the number of coupled battery cells.

3. The method according to claim 1, wherein the automatically adapting the power consumption includes automatically adjusting an amount of time in which an electrical component connected to the control circuit is powered with electrical energy from the battery cells by the control circuit.

4. The method according to claim 3, wherein the electrical component includes at least one of (a) a light emitting diode, (b) a voltage reference, and (c) a temperature sensor coupled to the control circuit.

5. The method according to claim 1, wherein the automatically adapting the power consumption includes automatically adjusting an amount of low-power time of the control circuit.

6. The method according to claim 1, wherein the battery cells are coupled in a series connection, and wherein the supplying of the control circuit with electrical energy from the coupled battery cells includes supplying the control circuit with the electrical energy from end terminals of the series connection.

7. The method according to claim 1, wherein the battery cells are coupled in a series connection, and wherein the control circuit is connected to each terminal of each cell of the plurality of battery cells.

8. A control circuit configured to control a plurality of battery cells, comprising:
    a plurality of terminals configured to be coupled to the plurality of battery cells;
    a power supply unit configured to generate electrical energy for the control circuit from electrical energy of the battery cells;
    a battery cell control unit configured to determine a number of battery cells coupled to the control circuit; and
    an energy control unit configured to adapt a power consumption drawn from the battery cells in response to the number of coupled battery cells.

9. The control circuit according to claim 8, wherein the energy control unit is coupled to a balancing circuit, wherein the energy control unit is configured to adapt the power consumption by directing electrical energy to the balancing circuit in response to the number of coupled battery cells.

10. The control circuit according to claim 8, wherein the control circuit includes a further terminal adapted to couple the control circuit to an external component, wherein the energy control unit is configured to adapt the power consumption by adjusting an amount of time in which the external component is powered with electrical energy.

11. The control circuit according to claim 10, wherein the external component includes at least one (a) a light emitting diode, (b) a voltage reference, and (c) a temperature sensor.

12. The control circuit according to claim 8, wherein the energy control unit is configured to adapt the power consumption by adjusting an amount of low-power time of the control circuit.

13. The control circuit according to claim 8, wherein the battery cells are connected in a series connection and the power supply unit is coupled to end terminals of the series connection.

14. A battery module, comprising:
    a plurality of battery groups, each battery group including:
        a plurality of battery cells; and
        a control circuit configured to control the plurality of battery cells of the battery group;
    wherein the control circuit includes:
        a plurality of terminals coupled to the plurality of battery cells;
        a power supply unit configured to generate electrical energy for the control circuit from electrical energy of the battery cells;
        a battery cell control unit configured to determine a number of battery cells coupled to the control circuit; and
        an energy control unit configured to adapt a power consumption drawn from the battery cells in response to the number of coupled battery cells.

15. The battery module according to claim 14, wherein the battery cells are connected in a series connection and each terminal of each of the plurality of battery cells is connected to the control circuit via the plurality of terminals.

16. A vehicle, comprising
    an electrical engine adapted to provide a driving force for driving the vehicle; and
    a battery module adapted to power the electrical engine, the battery module including a plurality of battery groups, each battery group including:
        a plurality of battery cells; and
        a control circuit configured to control the plurality of battery cells of the battery group;
    wherein the control circuit includes:
        a plurality of terminals coupled to the plurality of battery cells;
        a power supply unit configured to generate electrical energy for the control circuit from electrical energy of the battery cells;
        a battery cell control unit configured to determine a number of battery cells coupled to the control circuit; and
        an energy control unit configured to adapt a power consumption drawn from the battery cells in response to the number of coupled battery cells.

* * * * *